(12) United States Patent
Minamitani

(10) Patent No.: US 12,181,402 B2
(45) Date of Patent: Dec. 31, 2024

(54) CORROSIVE ENVIRONMENT MONITORING DEVICE AND CORROSIVE ENVIRONMENT MONITORING METHOD

(71) Applicant: Hitachi, Ltd., Tokyo (JP)

(72) Inventor: Rintarou Minamitani, Tokyo (JP)

(73) Assignee: HITACHI, LTD., Tokyo (JP)

( * ) Notice: Subject to any disclaimer, the term of this patent is extended or adjusted under 35 U.S.C. 154(b) by 171 days.

(21) Appl. No.: 17/918,142

(22) PCT Filed: Feb. 16, 2021

(86) PCT No.: PCT/JP2021/005682
§ 371 (c)(1),
(2) Date: Oct. 11, 2022

(87) PCT Pub. No.: WO2021/215091
PCT Pub. Date: Oct. 28, 2021

(65) Prior Publication Data
US 2023/0134944 A1 May 4, 2023

(30) Foreign Application Priority Data
Apr. 22, 2020 (JP) ................. 2020-075851

(51) Int. Cl.
*G01N 17/04* (2006.01)
*G01N 17/00* (2006.01)

(52) U.S. Cl.
CPC .......... *G01N 17/04* (2013.01); *G01N 17/006* (2013.01); *G01N 17/008* (2013.01); *G01N 17/043* (2013.01)

(58) Field of Classification Search
CPC ............... G01N 17/002; G01N 17/006; G01N 17/008; G01N 17/02; G01N 17/04;
(Continued)

(56) References Cited

U.S. PATENT DOCUMENTS

| 11,754,490 B2* | 9/2023 | King ...................... G01N 27/04 702/58 |
| 2015/0330889 A1* | 11/2015 | Minamitani ........... G01N 27/20 324/700 |
| 2018/0259442 A1 | 9/2018 | Minamitani et al. |

FOREIGN PATENT DOCUMENTS

| JP | 2003-294606 A | 10/2003 |
| WO | 2017/061182 A1 | 4/2017 |

OTHER PUBLICATIONS

International Search Report of PCT/JP2021/005682 dated Apr. 6, 2021.

* cited by examiner

*Primary Examiner* — Steven L Yeninas
(74) *Attorney, Agent, or Firm* — MATTINGLY & MALUR, PC

(57) ABSTRACT

A corrosive environment monitoring device that suppresses a decline in measurement precision in an initial period of monitoring the corrosivity of an environment and measures the corrosivity of the environment continuously and with high precision over a long period of time. The corrosive environment monitoring device includes: a layered body having an insulating plate, a base metal thin film that is formed on the insulating plate and is corrosion resistant with respect to a corrosive substance, and a sensing metal thin film that is formed on the base metal thin film and is corrosion susceptible with respect to the corrosive substance; and a housing that encloses the layered body, has an opening oriented in a side face direction, and forms a gas passage inside for the corrosive substance, wherein the sensing metal thin film is formed in a limited region on the base metal thin film.

7 Claims, 8 Drawing Sheets

FIG. 6

(58) Field of Classification Search
CPC .... G01N 17/043; G01N 27/04; G01N 27/041; G01N 27/20
See application file for complete search history.

CORROSIVE ENVIRONMENT MONITORING DEVICE AND CORROSIVE ENVIRONMENT MONITORING METHOD

TECHNICAL FIELD

The present invention relates to a corrosive environment monitoring device and a corrosive environment monitoring method.

Particularly, the present invention relates to a corrosive environment monitoring device and a corrosive environment monitoring method measuring the degree of corrosion in the environment, and a corrosive environment monitoring device and a corrosive environment monitoring method measuring the corrosive gas concentration in the environment from the degree of corrosion in the environment.

Particularly, the present invention relates to a corrosive environment monitoring device and a corrosive environment monitoring method measuring the degree of corrosion in the environment caused by a corrosive gas present in the environment and a corrosive environment monitoring device and a corrosive environment monitoring method measuring the corrosive gas concentration in the environment from the degree of corrosion in the environment objecting the disposal environment, the storage environment, and the transportation environment of an electric and electronic device.

Also, the present invention relates to a corrosive environment monitoring device and a corrosive environment monitoring method measuring the degree of corrosion in the environment caused by a corrosive gas present in the environment and a corrosive environment monitoring device and a corrosive environment monitoring method measuring the corrosive gas concentration in the environment from the degree of corrosion in the environment objecting the testing environment of a gas corrosion test device and an out gas test device that is for a gas generated from organic material.

BACKGROUND ART

As a background art of the field of the present technology, there is WO 2017-061182 (Patent Literature 1).

In Patent Literature 1, there is disclosed a corrosive environment monitoring device configured of a housing, a first thin-film metal, a second thin-film metal, and terminals, the housing including an opening portion in one surface thereof, the surface other than the surface of the opening portion being sealed to form a space portion inside the housing, the first thin-film metal being disposed from the back side of the space portion toward the opening portion, the first thin-film metal being resistant to corrosion by a corrosive substance, the second thin-film metal being disposed from the back side of the space portion toward the opening portion along the first thin-film metal using the first thin-film metal as a support member, the second thin-film metal being a measuring member susceptible to corrosion by the corrosive substance, the terminals being disposed on both sides of the first thin-film metal, an external voltage being applied to the terminals, in which the second thin-film metal is disposed from the back side of the space portion toward the opening portion on one side or both sides of the one first thin-film metal that is disposed from the back side of the space portion toward the opening portion.

CITATION LIST

Patent Literature

Patent Literature 1: WO 2017-061182

SUMMARY OF INVENTION

Technical Problem

With respect to social infrastructure facilities such as an electric power, a sewage line, and a plant, since the shutdown by a failure affects the social activities, stable operation is required. Particularly, with respect to the facilities operating under the environment with severe corrosiveness, it is also important to secure corrosion resistance of an electronic device such as an information device and a control device attached to the facility along with corrosion resistance of the facility itself.

Although an appropriate corrosion resistant measure has been taken for an electronic device attached to a facility where a corrosion trouble is expected, in a facility where the installation result is less and the corrosion resistant measure is insufficient, a new corrosion trouble may possibly occur. In order to take an appropriate corrosion resistant measure in such facility, it is effective to quickly measure and diagnose the environment of the actual cite, and a corrosive environment monitoring device has been desired for which is capable of continuously measuring the corrosiveness of the environment over a long period of time.

The corrosive environment monitoring device described in Patent Literature 1 can continuously measure the corrosiveness of the environment over a long period of time even under an environment where the corrosiveness is extremely severe (IC 5 class of ISO 11844-1 Standards).

However, in Patent Literature 1, there is no description on a corrosive environment monitoring device capable of improving the measurement accuracy at an early stage of monitoring of corrosiveness of the environment.

Therefore, the present invention provides a corrosive environment monitoring device and a corrosive environment monitoring method which suppress deterioration of the measurement accuracy at an early stage of monitoring of corrosiveness of the environment and continuously measure corrosiveness of the environment with high accuracy for a long period of time even under an environment where the corrosiveness is extremely severe in all time periods of monitoring.

Solution to Problem

In order to solve the problem described above, a corrosive environment monitoring device of the present invention includes a laminated body and a case, the laminated body including an insulation plate, a base metal thin film, and a sensing metal thin film, the base metal thin film being formed on the insulation plate and being resistant to corrosion by a corrosive substance, the sensing metal thin film being formed on the base metal thin film and being susceptible to corrosion by the corrosive substance, the case containing the laminated body, including an opening portion in a side surface direction, and forming a gas passage for the corrosive substance in the inside, and the sensing metal thin film is formed in a partial area on the base metal thin film.

Also, in order to solve the problem described above, a corrosive environment monitoring method of the present invention measures the degree of corrosion in the environment using the corrosive environment monitoring device described above, and includes a step for accelerating an extension rate of an area where a corrosion product is produced in a partial area.

Advantageous Effects of Invention

According to the present invention, it is possible to provide a corrosive environment monitoring device and a corrosive environment monitoring method which suppress deterioration of the measurement accuracy at an early stage of monitoring of corrosiveness of the environment and continuously measure corrosiveness of the environment with high accuracy for a long period of time even under an environment where the corrosiveness is extremely severe in all time periods of monitoring.

Also, problems, configurations, and effects other than those described above will be clarified by explanation of embodiments described below.

DESCRIPTION OF EMBODIMENTS

Figure 1:
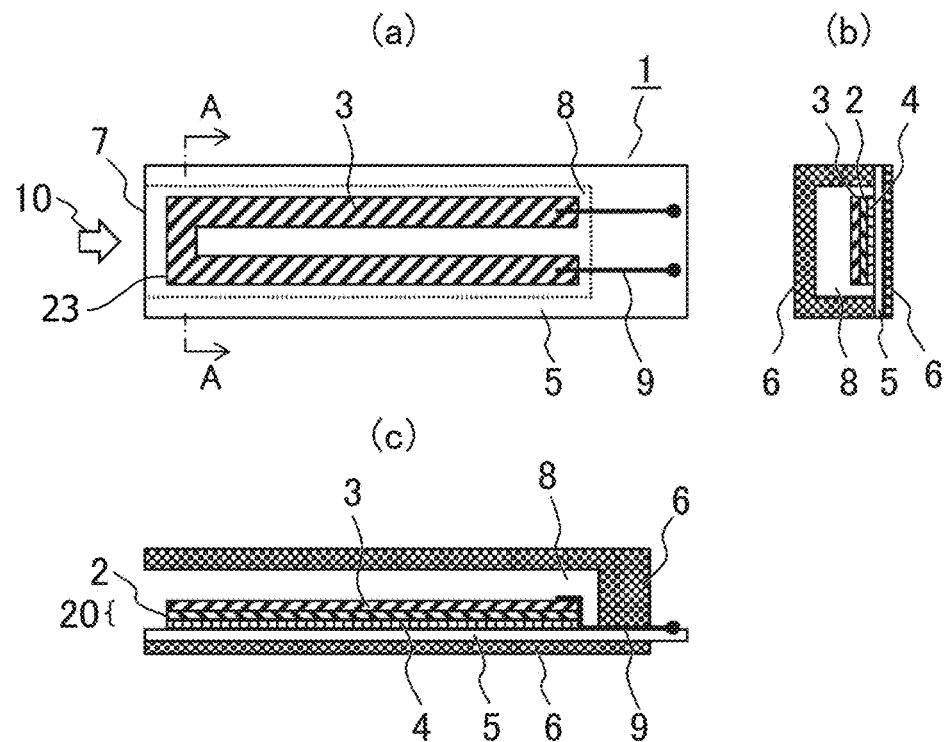
FIG. 1(a) is a top view.
FIG. 1(b) is a side view of the section A-A.
FIG. 1(c) is a front view of a corrosive environment monitoring device 1 of a conventional example.

Embodiments of the present invention will be hereinafter explained using the drawings. Also, a configuration substantially same or similar will be marked with a same reference sign, and when explanation is duplicated, there is a case of omitting explanation of it.

From now on, in the present embodiments, explanation will be made on a corrosive environment monitoring device and a corrosive environment monitoring method which suppress deterioration of the measurement accuracy at an early stage of monitoring of corrosiveness of the environment and continuously measure corrosiveness of the environment with high accuracy for a long period of time even under an environment where the corrosiveness is extremely severe in all time periods of monitoring.

Also, in the present embodiments, explanation will be made particularly on a corrosive environment monitoring device and a corrosive environment monitoring method measuring the degree of corrosion in the environment (presence/absence of a corrosive gas).

Conventional Example

First, prior to explanation of the present embodiments, a corrosive environment monitoring device of a conventional example will be explained using FIG. 1, FIG. 2, FIG. 3, and FIG. 4.

FIG. 1(a) is a top view, FIG. 1(b) is a side view of the section A-A, and FIG. 1(c) is a front view of a corrosive environment monitoring device 1 of the conventional example.

The corrosive environment monitoring device 1 has a configuration described below.

(1) A sensor chip 20 including an insulation plate 4, a base metal thin film 2 formed of material resistant to corrosion by a corrosive gas 10 present in the environment and having small resistance temperature variation, and a sensing metal thin film 3 formed in all areas on the base metal thin film 2 using the base metal thin film 2 as a support member, formed of material susceptible to corrosion by the corrosive gas 10, and having a squarish C-shape, (2) a substrate 5 forming the sensor chip 20, (3) a case 6 containing the substrate 5, including an opening portion 7 of a gas passage 8 in a side surface direction (one surface), and forming the gas passage 8 for the corrosive gas 10 in the inside by sealing the other surface other than the surface of the opening portion 7 of the one surface, and (4) leading electrodes 9 formed at both ends of the sensor chip 20 and measuring the electric resistance value.

Here, the squarish C-shape includes a short side portion 23 formed to have a predetermined width on the opening portion 7 side and two long side portions formed to have a predetermined width from both sides of the short side portion 23 and the opening portion 7 side toward the back side (the right side of FIG. 1 (a) and FIG. 1 (c)) of the gas passage 8.

That is to say, the corrosive environment monitoring device 1 includes the case 6, the base metal thin film. 2, the sensing metal thin film. 3, and the leading electrodes 9, the case 6 including the opening portion 7 in one surface and forming the gas passage 8 of the corrosive gas 10 in the inside by sealing the other surface other than the surface of the opening portion 7 of one surface, the base metal thin film 2 being formed from the opening portion 7 side toward the back side of the gas passage 8 and being resistant to corrosion by the corrosive gas 10, the sensing metal thin film 3 being a measuring member formed from the opening portion 7 side toward the back side of the gas passage 8 along the base metal thin film 2 using the base metal thin film 2 as a support member and being susceptible to corrosion by the corrosive gas 10, the leading electrodes 9 being formed on both sides of the base metal thin film 2 and measuring the electric resistance value.

FIG. 2(a) is a top view, FIG. 2(b) is a side view of the section A-A, and FIG. 2(c) is a front view of the corrosive environment monitoring device 1 of a conventional example after exposure.

Figure 2:
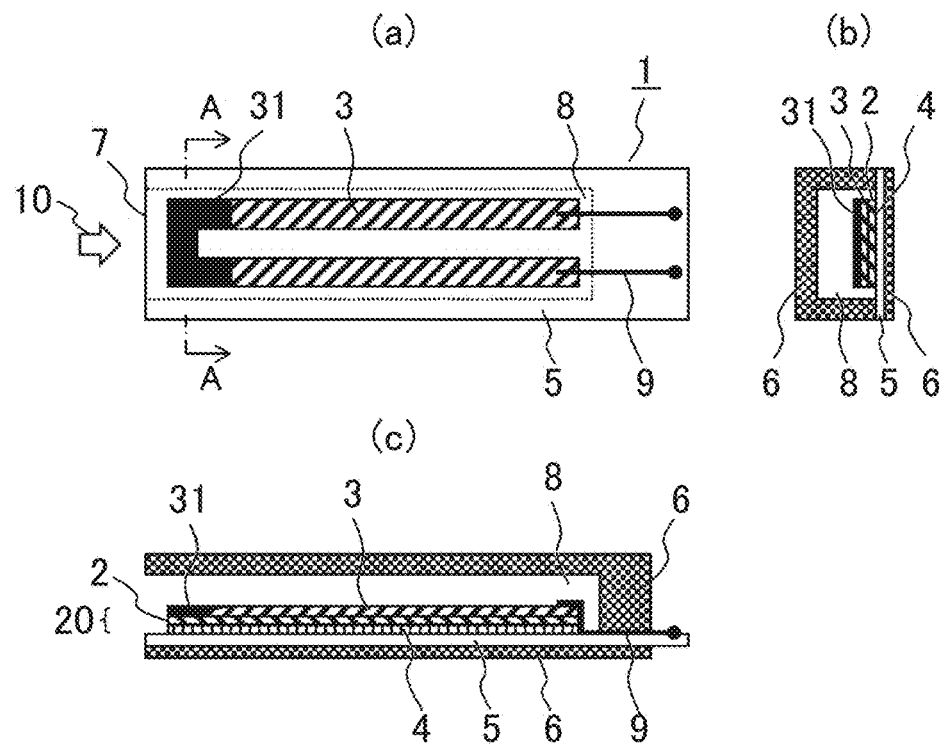
FIG. 2(a) is a top view.
FIG. 2(b) is a side view of the section A-A.
FIG. 2(c) is a front view of the corrosive environment monitoring device 1 of the conventional example after exposure.

When the corrosive environment monitoring device 1 of a conventional example is exposed into the environment, as shown in FIG. 2, the corrosive gas 10 present in the environment enters from the opening portion 7, and the corrosion area (an area where a corrosion product 31 is formed) of the sensing metal thin film 3 extends from the opening portion 7 where the concentration flux of the corrosive gas 10 is high) toward the back side (the right side) of the gas passage 8.

This extension of the corrosion area can be explained as described below. That is to say, when the corrosion product 31 formed by corrosion of the sensing metal thin film 3 reaches the lower surface of the sensing metal thin film 3 (the interface with the base metal thin film 2), corrosion does not extend to the lower surface direction more than that. Therefore, the corrosive gas 10 is not consumed for the corrosion reaction in the lower surface direction and is consumed for the corrosion reaction toward the back side of the gas passage 8, and the corrosive gas 10 corrodes the sensing metal thin film 3 toward the back side of the gas passage 8.

At this time, at the upper surface of the sensing metal thin film 3 (the surface being in contact with the gas passage 8), progress of corrosion is fast compared to the lower surface of the sensing metal thin film 3 as shown in FIG. 2 (c). This behavior of corrosion is achieved by the gas passage 8 that limits the diffusion direction of the corrosive gas 10 and controls the corrosion rate of the sensing metal thin film 3.

Also, since a part of the sensing metal thin film 3 changes to the corrosion product 31 corrosion as shown in FIG. 2 (a), the electric resistance value between the leading electrodes 9 formed at both ends of the sensor chip 20 becomes larger after exposure compared to the time before exposure (the initial value).

Here, metal used for the sensing metal thin film 3 (sensing metal) is metal having a small specific resistance and metal where the specific resistance of the corrosion product 31 to be produced is large. Also, metal used for the base metal thin film 2 (base metal) is metal having a larger specific resistance compared to the sensing metal.

Also, by obtaining the relation between the corrosion amount of the sensing metal thin film 3 and the electric resistance value between the leading electrodes 9 in advance, the corrosion amount can be estimated from the electric resistance value having been measured. Also, by obtaining the relation between the corrosion amount of the sensing metal thin film 3 and the corrosive gas concentration in the environment in advance, the corrosive gas concentration can be estimated from the electric resistance value having been measured.

Figure 3:
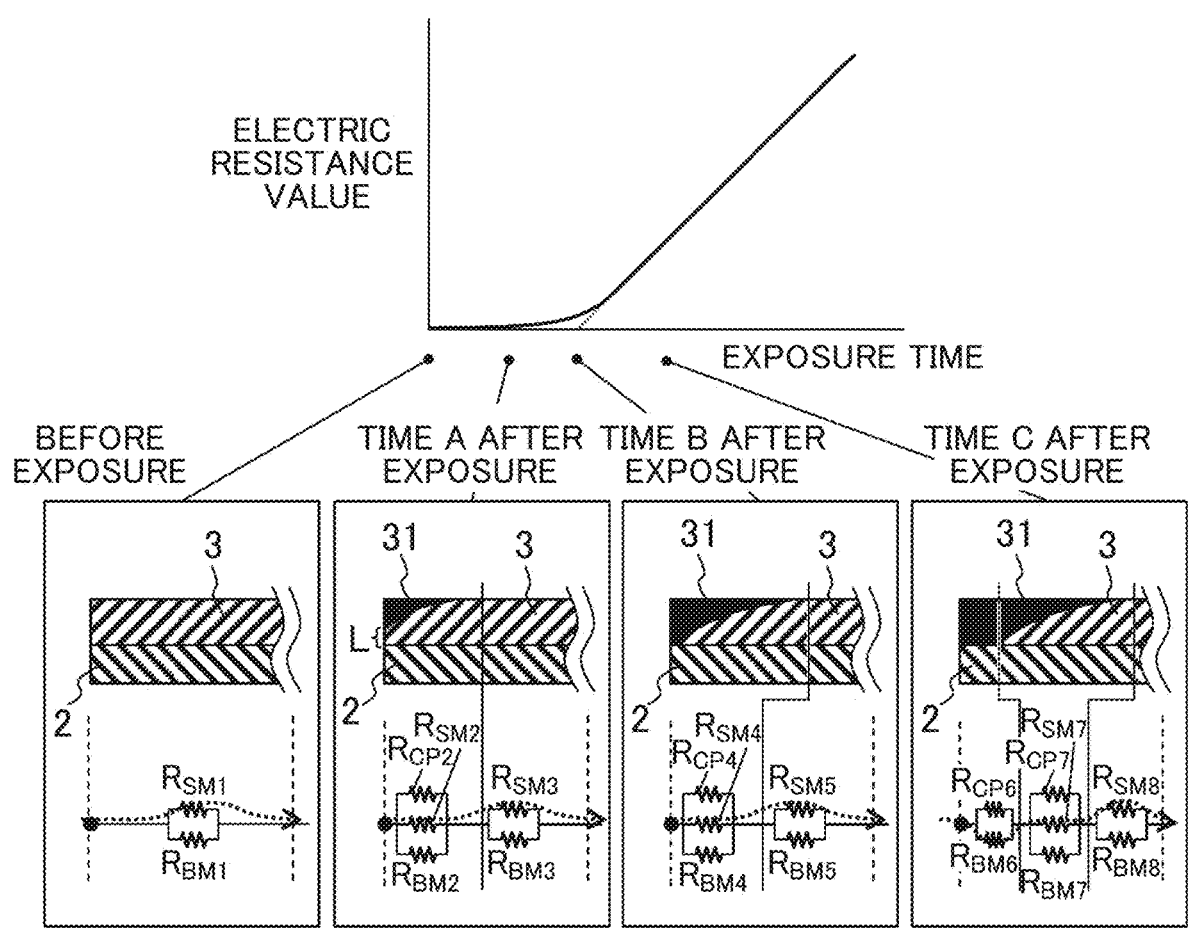
FIG. 3 is a front view showing a corrosion state of a laminated body including an insulation plate, a base metal thin film, and a sensing metal thin film before exposure, at time A after exposure, at time B after exposure, and at time C after exposure and a graph showing relation between the time of exposure corresponding to the corrosion state and the electric resistance value in the corrosive environment monitoring device 1 of the conventional example.

FIG. 3 is a front view showing a corrosion state of a laminated body including an insulation plate, a base metal thin film, and a sensing metal thin film before exposure, at time A after exposure, at time B after exposure, and at time C after exposure and a graph showing relation between the time of exposure corresponding to the corrosion state and the electric resistance value in the corrosive environment monitoring device 1 of a conventional example.

Here, the variation of the electric resistance value between the leading electrodes 9 formed at both ends of the sensor chip 20 corresponding to the corrosion state before exposure, at time A after exposure, at time B after exposure, and at time C after exposure (time A after exposure<time B after exposure<time C after exposure) of the corrosive environment monitoring device 1 of the conventional example will be explained schematically.

Further, although the corrosion environment monitoring device 1 of the conventional example shown in FIG. 1 is explained using the sensor chip 20, here, in order to simplify the explanation, explanation will be made using a senor chip of the I-type (rectangular shape). Also, in FIG. 3, the opening portion 7 side out of the I-type sensor chip is shown to be enlarged. Further, it is assumed that the electric resistance value is measured at both ends of the I-type sensor chip.

Before exposure, both of the base metal thin film 2 and the sensing metal thin film 3 are not corroded.

The electric resistance value of the sensor chip before exposure is expressed by a parallel circuit of an electric resistance $R_{BM1}$ of the base metal thin film 2 and an electric resistance $R_{SM1}$ of the sensing metal thin film 3.

Also, since the specific resistance of the sensing metal is smaller compared to the specific resistance of the base metal, the electric resistance value of the sensor chip before exposure is expressed by an electric resistance value of the sensing metal thin film 3 (electric resistance $R_{SM1}$).

At the time A after exposure, the corrosion product 31 is formed from upper surface of the sensing metal thin film 3 being in contact with the gas passage 8 by the corrosive gas 10 present in the environment. Since the corrosive gas 10 enters from the opening portion 7 (left side) toward the back side (the right side) of the gas passage 8, the sensing metal thin film 3 corrodes from the opening portion 7 where the concentration flux of the corrosive gas 10 is high.

At the time A after exposure, the corrosion product 31 is formed partly at the left end of the sensing metal thin film 3, and the sensing metal thin film 3 remains by L.

The electric resistance value of the sensor chip at the time A after exposure is expressed by an equivalent circuit of an electric resistance $R_{BM2}$ and an electric resistance $R_{BM3}$ of the base metal thin film 2, an electric resistance $R_{SM2}$ and an electric resistance $R_{SM3}$ of the sensing metal thin film 3, and an electric resistance $R_{CP2}$ of the corrosion product 31.

Also, the electric resistance value of the sensor chip at the time A after exposure becomes one shown by the arrow mark of the dotted line because of the magnitude relation of the specific resistance of the base metal, the specific resistance of the sensing metal, and the specific resistance of the corrosion product 31, and can be approximated by a series circuit (series resistance) of the electric resistance $R_{SM2}$ and the electric resistance $R_{SM3}$ of the sensing metal thin film 3. Further, the variation of the electric resistance value of the sensor chip at the time A after exposure and the electric resistance value of the sensor chip before exposure is still small.

At the time B after exposure, the corrosion product 31 is formed from the upper surface of the sensing metal thin film 3 being in contact with the gas passage 8 by the corrosive gas 10 present in the environment. Since the corrosive gas 10 enters further from the opening portion 7 (left side) toward the back side of the gas passage 8, the sensing metal thin film 3 corrodes further from the opening portion 7 where the concentration flux of the corrosive gas 10 is high.

At the time B after exposure, at the left end of the sensing metal thin film 3, the corrosion product 31 reaches the lower surface of the sensing metal thin film 3, and the sensing metal thin film 3 does not remain.

The electric resistance value of the sensor chip at the time B after exposure is expressed by an equivalent circuit of an electric resistance $R_{BM4}$ and an electric resistance $R_{BM5}$ of the base metal thin film 2, an electric resistance $R_{SM4}$ and an electric resistance $R_{SM5}$ of the sensing metal thin film 3, and an electric resistance $R_{CP4}$ of the corrosion product 31.

Also, the electric resistance value of the sensor chip at the time B after exposure becomes one shown by the arrow mark of the dotted line because of the magnitude relation of the specific resistance of the base metal, the specific resistance of the sensing metal, and the specific resistance of the corrosion product 31, and can be approximated by a series circuit (direct resistance) of the electric resistance $R_{SM4}$ and the electric resistance $R_{SM5}$ of the sensing metal thin film 3. Further, the variation of the electric resistance value of the sensor chip at the time B after exposure and the electric resistance value of the sensor chip before exposure is still small.

Also, after the time B after exposure, variation of the electric resistance value of the sensor chip becomes large.

At the time C after exposure, the corrosion product 31 is formed from the upper surface of the sensing metal thin film 3 being in contact with the gas passage 8 by the corrosive gas 10 present in the environment. Since the corrosive gas 10 enters further more from the opening portion 7 (left side) toward the back side of the gas passage 8, the sensing metal thin film 3 corrodes further more from the opening portion 7 where the concentration flux of the corrosive gas 10 is high.

At the time C after exposure, at the left end of the sensing metal thin film 3, the corrosion product 31 reaches the lower surface of the sensing metal thin film 3, the sensing metal thin film 3 does not remain, and the corrosion product 31 is formed toward the back side of the gas passage 8 also in the lower surface of the sensing metal thin film 3.

The electric resistance value of the sensor chip at the time C after exposure is expressed by an equivalent circuit of an electric resistance $R_{BM6}$, an electric resistance $R_{BM7}$, and an electric resistance $R_{BM8}$ of the base metal thin film 2, an electric resistance $R_{SM7}$ and an electric resistance $R_{SM8}$ of the sensing metal thin film 3, and an electric resistance $R_{CP6}$ and an electric resistance $R_{CP7}$ of the corrosion product 31.

Also, the electric resistance value of the sensor chip at the time C after exposure becomes one shown by the arrow mark of the dotted line because of the magnitude relation of the specific resistance of the base metal, the specific resistance of the sensing metal, and the specific resistance of the corrosion product 31, and can be approximated by a series circuit (series resistance) of the electric resistance $R_{BM6}$ of the base metal thin film 2 and the electric resistance $R_{SM7}$ and the electric resistance $R_{SM8}$ of the sensing metal thin film 3. Further, the variation of the electric resistance value of the sensor chip at the time C after exposure and the electric resistance value of the sensor chip before exposure is large.

Figure 4:
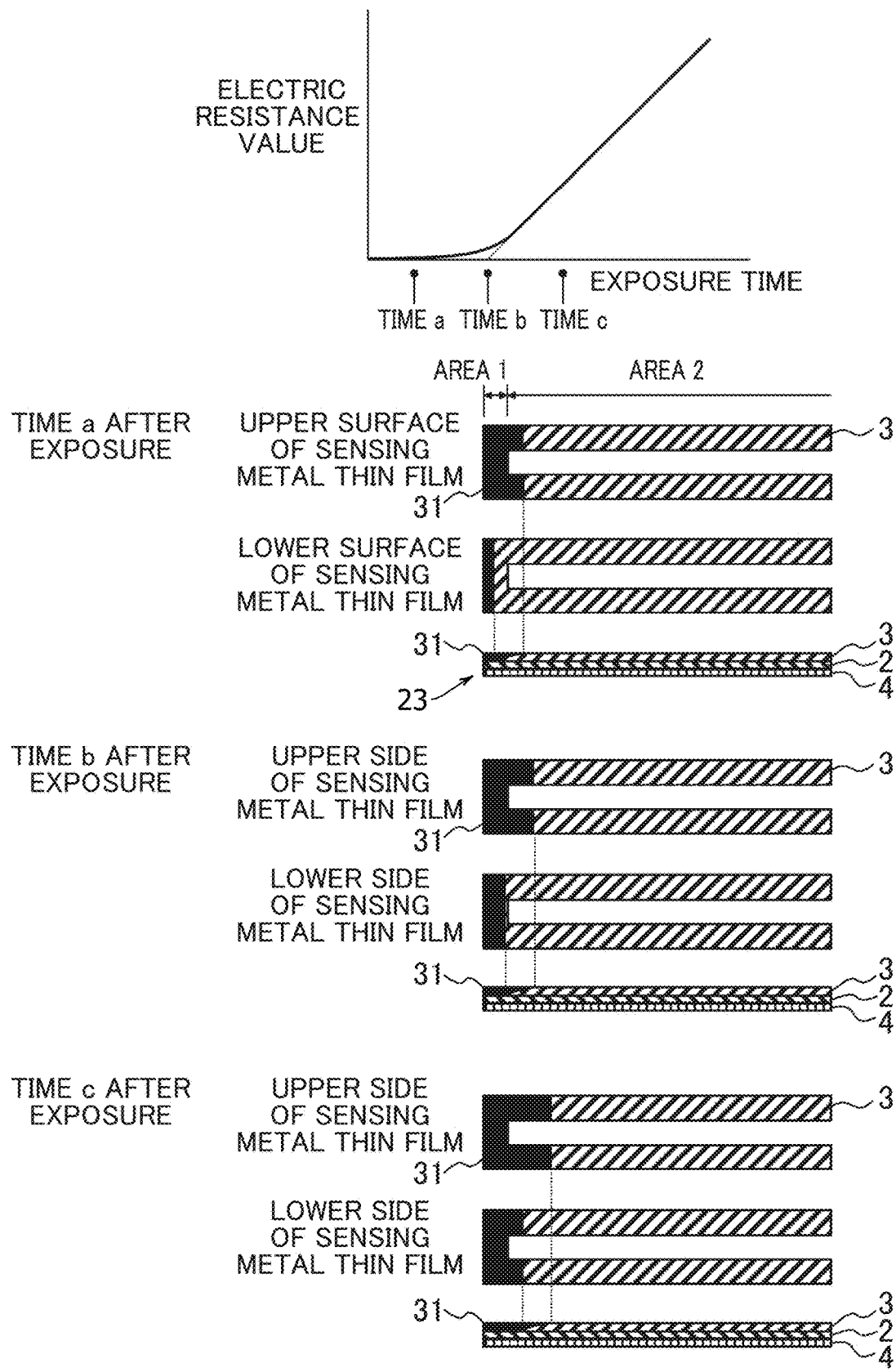
FIG. 4 is a top view and a front view showing a corrosion state of a laminated body including an insulation plate, a base metal thin film, and a sensing metal thin film at each of time a after exposure, time b after exposure, and time c after exposure, and a graph showing relation between the time of exposure corresponding to the corrosion state and the electric resistance value in the corrosive environment monitoring device 1 of the conventional example.

FIG. 4 is a top view and a front view showing a corrosion state of a laminated body including an insulation plate, a base metal thin film, and a sensing metal thin film at each of time a after exposure, time b after exposure, and time c after exposure and a graph showing relation between the time of exposure and the corrosion state and the electric resistance value in the corrosive environment monitoring device 1 of the conventional example.

Here, explanation will be made on a problem that the measurement accuracy at an early stage in monitoring corrosiveness of the environment deteriorates in the corrosive environment monitoring device 1.

At the time a after exposure, on the left side of the sensing metal thin film 3, the corrosion product 31 reaches the lower surface of the sensing metal thin film 3, the sensing metal thin film 3 does not remain, and the corrosion product 31 is formed toward the back side (the right side) of the gas passage 8 also in the lower surface of the sensing metal thin film 3. That is to say, on the left side of the sensing metal thin film 3, an area where the sensing metal thin film 3 does not remain is noticed.

However, in the corrosive environment monitoring device 1 of the conventional example using the sensor chip 20, when the sensing metal thin film 3 may remain even slightly in an area 1 (a portion of the width of the short side portion 23) in FIG. 4 in spite that such corrosion progresses, the electric resistance value of the sensor chip 20 does not change virtually.

That is to say, at the time a after exposure, variation of the electric resistance value of the sensor chip 20 is small. Therefore, the measurement accuracy at ah early stage in monitoring corrosiveness of the environment deteriorates.

On the other hand, after the time b after exposure when all of the area 1 in FIG. 4 corrodes (the sensing metal thin film 3 does not remain in the area 1 in FIG. 4), variation of the electric resistance value of the sensor chip 20 becomes large, and variation of the electric resistance value of the sensor chip 20 is large at the time c after exposure.

First Embodiment

Next, the corrosive environment monitoring device 1 of the first embodiment will be explained. Also, the basic configuration of the corrosive environment monitoring device 1 of the conventional example is applied also to the first embodiment.

Figure 5:
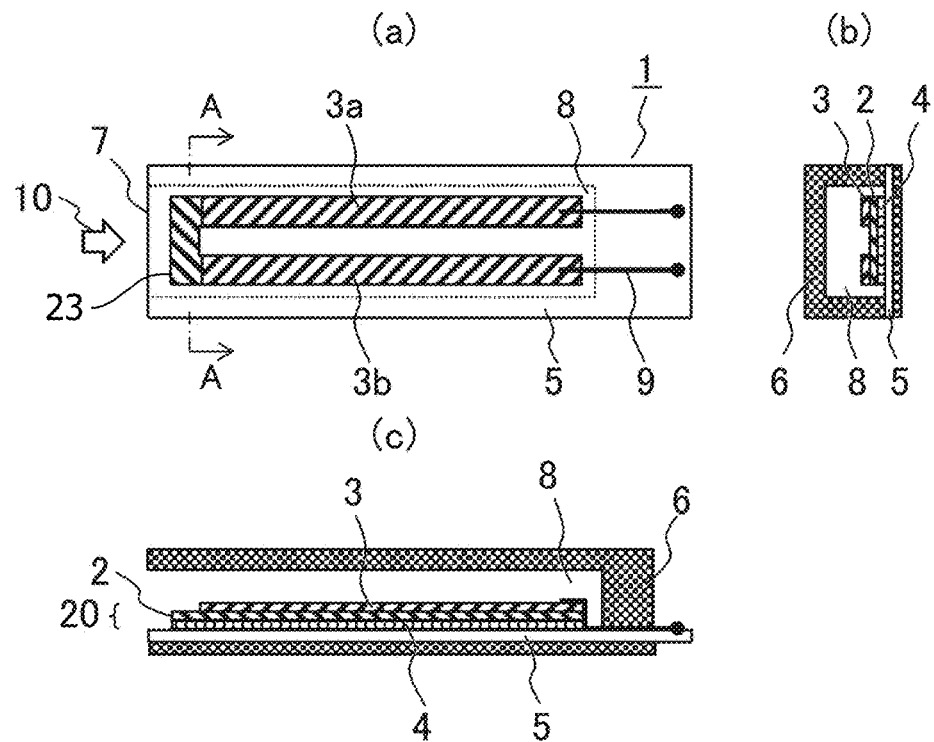
FIG. 5(a) is a top view.
FIG. 5(b) is a side view of the section A-A.
FIG. 5(c) is a front view of a corrosive environment monitoring device 1 of the first embodiment.

FIG. 5(a) is a top view, FIG. 5(b) is a side view of the section A-A, and FIG. 5(c) is a front view of the corrosive environment monitoring device 1 of the first embodiment.

The corrosive environment monitoring device 1 of the first embodiment has a configuration described below.

(1) A sensor chip (laminated body) 20 including the insulation plate 4, the base metal thin film 2 formed on the insulation plate 4, formed of material resistant to corrosion by a corrosive gas 10 present in the environment (corrosive substance such as $SO_2$, $NO_2$, $H_2S$, $S_8$ for example), and having small resistance temperature variation, and the sensing metal thin film 3 (1 μm or less of the thickness) which is a measuring member formed on the base metal thin film 2 using the base metal thin film 2 as a support member, formed of material susceptible to corrosion by the corrosive gas 10, and formed in a partial area (two long side portions 3a and 3b) on the base metal thin film 2, (2) the substrate 5 forming the sensor chip 20, (3) the case 6 containing the sensor chip 20, including the opening portion 7 (10 mm or less of the width and 5 mm or less of the height) in a side surface direction (one surface), and forming the gas passage 8 for the corrosive gas 10 in the inside by sealing the other surface other than the surface of the opening portion 7 of the one surface, and (4) the leading electrodes 9 formed at both ends of the sensor chip 20 and measuring the electric resistance value.

That is to say, the corrosive environment monitoring device I of the first embodiment includes the case 6, the base metal thin film 2, the sensing metal thin film 3, and the leading electrodes 9, the case 6 including the opening portion 7 in one surface and forming the gas passage 8 of the corrosive gas 10 in the inside by sealing the other surface other than the surface of the opening portion 7 of one surface, the base metal thin film 2 being formed from the opening portion 7 side toward the back side (the right side) of the gas passage 8 and being resistant to corrosion by the corrosive gas 10, the sensing metal thin film 3 being a measuring member formed in two long side portions (3a and 3b) from the opening portion 7 side toward the back side of the gas passage 8 along the base metal thin film. 2 using the base metal thin film 2 as a support member and being susceptible to corrosion by the corrosive gas 10, the leading electrodes 9 being formed on both sides of the base metal thin film 2 and measuring the electric resistance value.

Thus, with respect to the corrosive environment monitoring device 1 of the first embodiment, particularly, the base metal thin film 2 is formed into the short side portion 23 formed to have a predetermined width on the opening portion 7 side on the insulation plate 4 and two long side portions formed to have a predetermined width on both sides of the short side portion 23 from the opening portion 7 side toward the back side of the gas passage 8, and the sensing metal thin film 3 is formed into two long side portions formed to have a predetermined width on the base metal thin film 2 and on both sides of the short side portion 23 from the opening portion 7 side toward the back side of the gas passage 8.

That is to say, with respect to the corrosive environment monitoring device 1 of the first embodiment, the short side portion 23 on the opening portion 7 side is a layered portion including the insulation plate 4 and the base metal thin film 2, and two long side portions (3a and 3b) are layered portions including the insulation plate 4, the base metal thin film 2, and the sensing metal thin film 3.

Also, a partial area on the base metal thin film 2 means two long side portions formed from the opening portion 7 side toward the back side of the gas passage 8 with the exception of the short side portion 23.

Also, with respect to the corrosive environment monitoring device 1 of the first embodiment, the opening portion 7 side of the sensing metal thin film 3 has a shape parallel to the opening portion 7.

Also, the sensing metal is metal having a small specific resistance and metal where the specific resistance of the corrosion product 31 to be produced is large. It is metal such as copper, copper alloy, silver, silver alloy (such as a silver-palladium alloy for example), aluminum, iron, zinc, lead for example, and is metal where the electric resistance value of the metal and its corrosion product 31 differs from each other.

Also, the base metal is metal having a larger specific resistance compared to the sensing metal. It is metal such as titanium, chromium, gold, palladium, stainless steel for example.

Also, as the corrosion product 31, silver sulfide is produced when silver is used for example for the sensing metal and the corrosive gas 10 is $H_2S$, $S_8$, and the like for example.

Also, the corrosive environment monitoring method of the first embodiment is to measure the degree of corrosion in the environment using such corrosive environment monitoring device 1 described above, and to accelerate the extension rate of an area where the corrosion product is produced in a partial area by forming a partial area in the sensing metal thin film 3.

Thus, according to the first embodiment, deterioration of the measurement accuracy at an early stage of monitoring of corrosiveness of the environment can be suppressed. Also, corrosiveness of the environment can be continuously measured with high accuracy for a long period of time even under the environment where corrosiveness is extremely severe in the entire period of monitoring.

Also, the base metal thin film 2 is formed to be shifted from the opening portion 7 to the back side of the gas passage 8, and the sensing metal thin film 3 is formed to be shifted more than the base metal thin film 2 from the opening portion 7 to the back side of the gas passage 8. Thus, the measurement accuracy at an early stage of monitoring of corrosiveness of the environment can be stabilized.

Also, in order to form the sensing metal thin film 3 in a partial are on the base metal thin film 2, steps described below are used.
(1) The base metal thin film 2 is formed on the insulation plate 4 by sputtering or plating.
(2) Next, an area other than the area where the sensing metal thin film 3 is formed (two long side portions formed on both sides of the short side portion 23 and formed to have a predetermined width from the opening portion 7 side toward the back side of the gas passage 8) is subjected to masking to form the sensing metal thin film 2 by sputtering or plating.

Also, in order to form the sensing metal thin film 3 in a partial are on the base metal thin film 2, steps described below are used.
(1) The base metal thin film 2 and the sensing metal film 3 are formed on the insulation plate 4 by sputtering or plating.
(2) Next, an area where the sensing metal thin film 3 is formed (two long side portions formed on both sides of the short side portion 23 and formed to have a predetermined width from the opening portion 7 side toward the back side of the gas passage 8) is subjected to masking, and the sensing metal thin film 3 is removed by etching. Also, for etching, a solution inactive for the base metal thin film 2 and active only for the sensing metal thin film 3 is used.

In order to form the sensing metal thin film 3 in a partial area on the base metal thin film 2, screen printing and ink jet printer printing also can be used.

Also, the corrosive environment monitoring device 1 of the first embodiment can be used also as a highly reliable gas sensor grasping variation of the corrosive gas concentration of the corrosive gas 10.

Second Embodiment

Next, the corrosive environment monitoring device 1 of the second embodiment will be explained. Also, the basic configuration of the corrosive environment monitoring device 1 of the conventional example is applied also to second embodiment.

Figure 6:
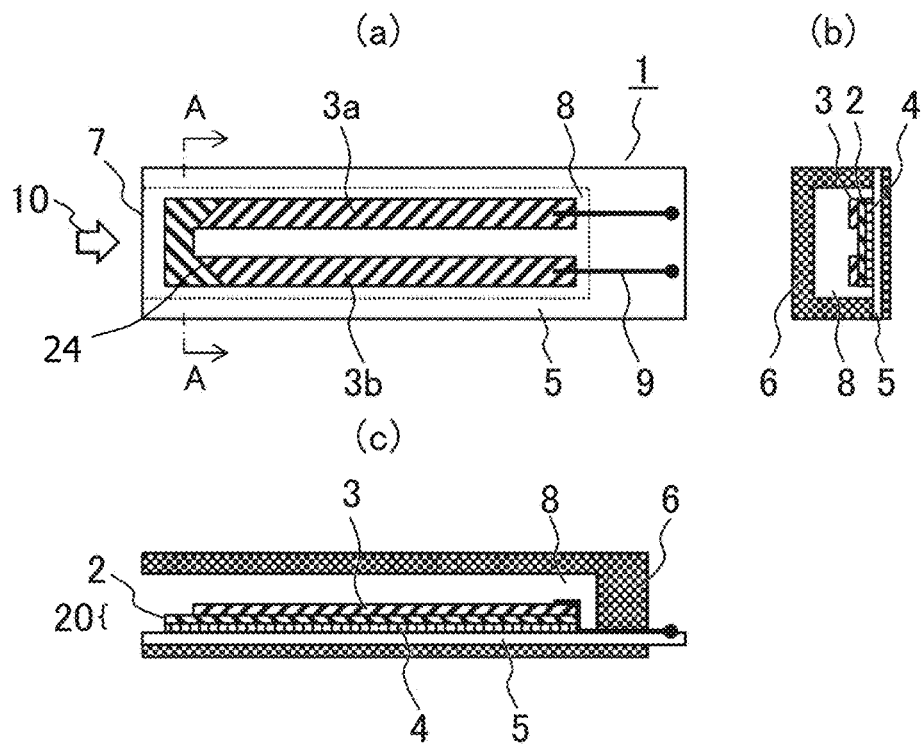
FIG. 6(a) is a top view.
FIG. 6(b) is a side view of the section A-A.
FIG. 6(c) is a front view of a corrosive environment monitoring device 1 of the second embodiment.

FIG. 6(*a*) is a top view, FIG. 6(*b*) is a side view of the section A-A, and FIG. 6(*c*) is a front view of the corrosive environment monitoring device 1 of the second embodiment.

The corrosive environment monitoring device 1 of the second embodiment differs in the distal end shape on the opening portion 7 side of the sensing metal thin film 3 compared to the corrosive environment monitoring device 1 of the first embodiment.

In the corrosive environment monitoring device 1 of the second embodiment, different from the corrosive environment monitoring device 1 of the first embodiment, an area where the width of the sensing metal thin film 3 is narrower (refer to FIG. 6 (*a*)) compared to an area on the back side of the gas passage 8 (an area with a constant cross-sectional area) is included on the opening portion 7 side of the sensing metal thin film 3. That is to say, in the sensing metal thin film 3 formed in a partial area on the base metal thin film 2, on the opening portion 7 side thereof, there is formed an area where the width of the sensing metal thin film 3 is narrower (an acute portion 24: an area where the width of the sensing metal thin film 3 becomes continuously large from the opening portion 7 side toward the back side of the gas passage 8) compared to an area on the back side of the gas passage 8.

Also, the acute portion 24 may be an area where the width of the sensing metal thin film 3 becomes large stepwise.

The acute portion 24 is an area where the cross-sectional area thereof increases from the opening portion 7 side toward the back side of the gas passage 8, and is an area where the width of the sensing metal thin film 3 continuously becomes larger from the opening portion 7 side toward the back side of the gas passage 8. The acute portion 24 is an area where the cross-sectional area thereof is smaller compared to the area on the back side of the gas passage 8.

Since the concentration flux of the corrosive gas 10 having entered from the opening portion 7 concentrates on the acute portion 24 where the width of the sensing metal thin film 3 is narrow, the time incurred until the sensing metal thin film 3 corrodes and the corrosion product 31 is produced becomes short, and in the acute portion 24, the extension rate of the area where the corrosion product 31 is produced becomes faster compared to an area on the back side of the gas passage 8 with respect to this acute portion 24.

Thus, according to the second embodiment, the time from before exposure until the time B after exposure can be shortened, and deterioration of the measurement accuracy at an early stage of monitoring of corrosiveness of the environment can be suppressed.

Third Embodiment

Next, the corrosive environment monitoring device 1 of the third embodiment will be explained. Also, the basic configuration of the corrosive environment monitoring device 1 of the conventional example is applied also to the third embodiment.

Figure 7:
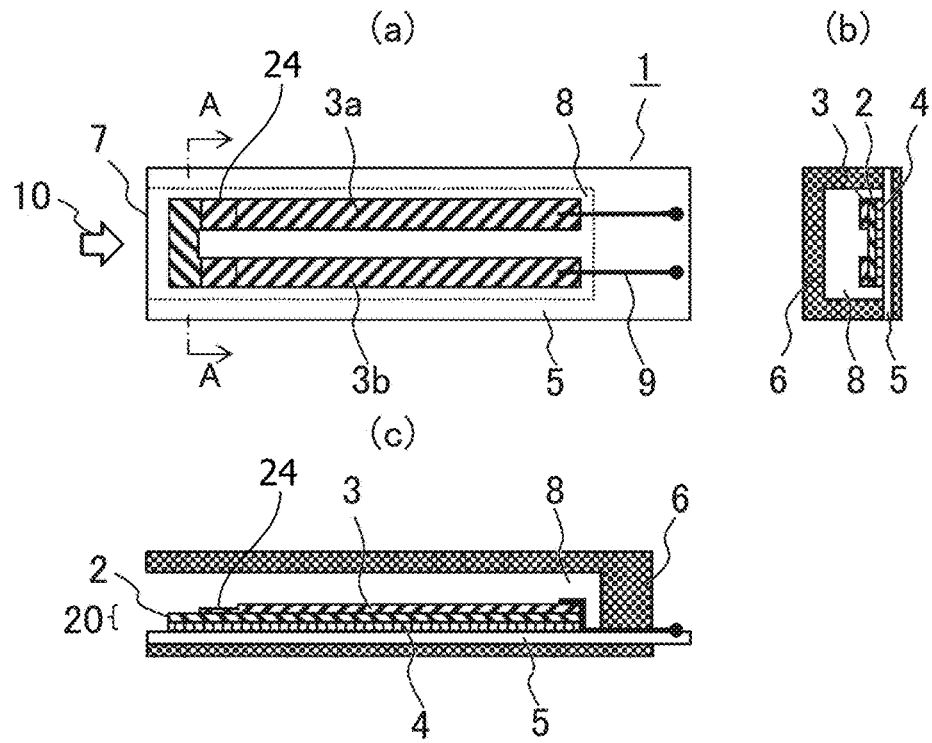
FIG. 7(a) is a top view.
FIG. 7(b) is a side view of the section A-A.
FIG. 7(c) is a front view of a corrosive environment monitoring device 1 of the third embodiment.

FIG. 7(*a*) is a top view, FIG. 7(*b*) is a side view of the section A-A, and FIG. 7(*c*) is a front view of the corrosive environment monitoring device 1 of the third embodiment.

The corrosive environment monitoring device 1 of the third embodiment differs in the distal end shape on the opening portion 7 side of the sensing metal thin film 3 compared to the corrosive environment monitoring device 1 of the first embodiment.

In the corrosive environment monitoring device 1 of the third embodiment, different from the corrosive environment monitoring device 1 of the first embodiment, an area where the film thickness of the sensing metal thin film 3 is thinner (refer to FIG. 7 (*c*)) compared to an area on the back side of the gas passage 8 (an area with a constant cross-sectional area) is included on the opening portion 7 side of the sensing metal thin film 3. That is to say, in the sensing metal thin film 3 formed in a partial area on the base metal thin film 2, on the opening portion 7 side thereof, there is formed an area where the film thickness of the sensing metal thin film 3 is thinner compared to an area on the back side of the gas passage 8 (an acute portion 24: an area where the height of the sensing metal thin film 3 becomes large stepwise or continuously from the opening portion 7 side toward the back side of the gas passage 8).

The area where the film thickness of the sensing metal thin film 3 is thin is an area where the cross-sectional area thereof is smaller compared to the area on the back side of the gas passage 8.

Since the concentration flux of the corrosive gas 10 having entered from the opening portion 7 concentrate on the area where the film thickness of the sensing metal thin film 3 is thin, the time incurred until the sensing metal thin film 3 corrodes and the corrosion product 31 is produced becomes short, and in the area where the film thickness is thin, the extension rate of the area where the corrosion product 31 is produced becomes faster compared to an area on the back side of the gas passage 8 with respect to this area where the film thickness is thin.

According to the third embodiment, the acute portion 24 is an area where the height of the sensing metal thin film 3 is lower compared to the area on the back side of the gas passage 8. This acute portion 24 may be an area where the height of the sensing metal thin film 3 becomes larger stepwise from the opening portion 7 side toward the back side of the gas passage 8, and may be an area where the height of the sensing metal thin film 3 becomes larger continuously from the opening portion ∂side toward the back side of the gas passage 8.

Thus, according to the third embodiment, the time from before exposure until the time B after exposure can be shortened, and deterioration of the measurement accuracy at an early stage of monitoring of corrosiveness of the environment can be suppressed.

Fourth Embodiment

Next, the corrosive environment monitoring device 1 of the fourth embodiment will be explained. Also, the basic configuration of the corrosive environment monitoring device 1 of the conventional example is applied also to the fourth embodiment.

Figure 8:
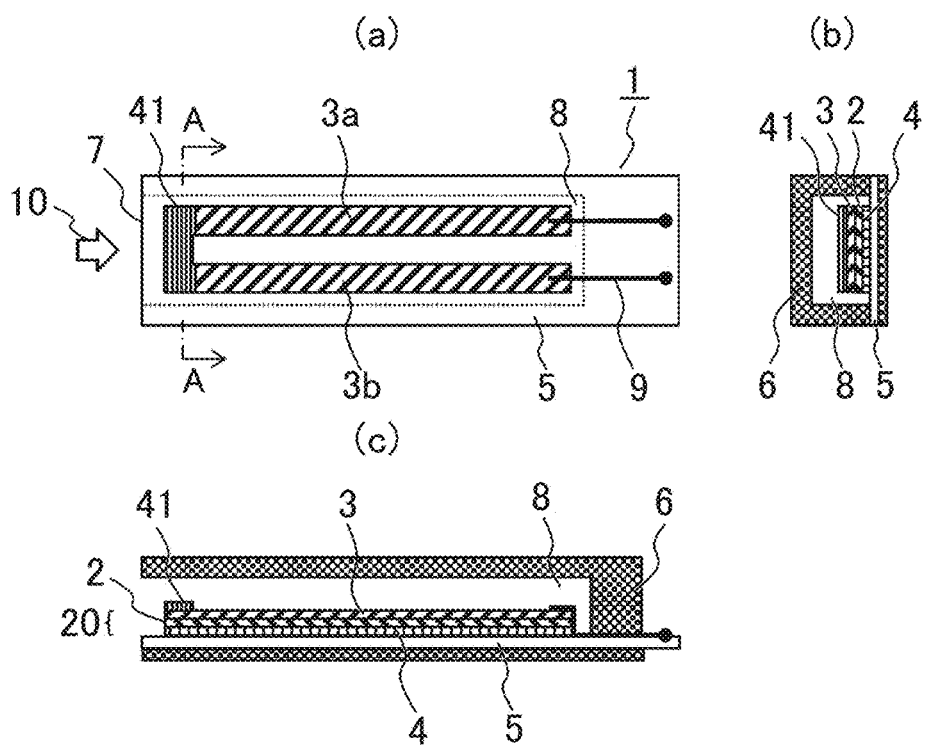
FIG. 8(a) is a top view.
FIG. 8(b) is a side view of the section A-A.
FIG. 8(c) is a front view of a corrosive environment monitoring device 1 of the fourth embodiment.

FIG. 8(*a*) is a top view, FIG. 8(*b*) is a side view of the section A-A, and FIG. 8(*c*) is a front view of the corrosive environment monitoring device 1 of the fourth embodiment.

The corrosive environment monitoring device 1 of the fourth embodiment differs in the point that a coating thin film 41 is formed on the opening portion 7 side of the sensing metal thin film 3 compared to the corrosive environment monitoring device 1 of the first embodiment.

In the corrosive environment monitoring device 1 of the fourth embodiment, different from the corrosive environment monitoring device 1 of the first embodiment, the coating thin film 41 is formed on the sensing metal thin film 3 on the opening portion side of the sensing metal thin film 3. That is to say, in the fourth embodiment, an area where the coating thin film 41 is formed is included on the opening portion 7 side of the sensing metal thin film 3.

Also, the coating thin film 41 is formed of a material resistant to carrion by the corrosive gas 10 and having small resistance temperature variation similarly to the base metal thin film 2. Further, the coating thin film 41 is not limited to a metal material and may be an organic material as long as it is such material that the corrosive gas 10 transmits the coating thin film 41 and does not cause the sensing metal thin film 3 formed therebeneath to corrode.

Since the concentration flux of the corrosive gas 10 having entered from the opening portion 7 concentrates on the side surface portion (the distal end portion) on the opening portion 7 side of the sensing metal thin film 3, the time incurred until the sensing metal thin film. 3 corrodes and the corrosion product 31 is produced becomes short, and in the area where the coating thin film 41 is formed, the extension rate of the area where the corrosion product 31 is produced becomes faster compared to an area on the back side of the gas passage 8 with respect to this area where the coating thin film 41 is formed.

Thus, according to the fourth embodiment, the time from before exposure until the time B after exposure can be shortened, and deterioration of the measurement accuracy at an early stage of monitoring of corrosiveness of the environment can be suppressed.

Fifth Embodiment

Next, the corrosive environment monitoring device 1 of the fifth embodiment will be explained. Also, the basic configuration of the corrosive environment monitoring device 1 of the conventional example is applied also to the fifth embodiment.

Figure 9:
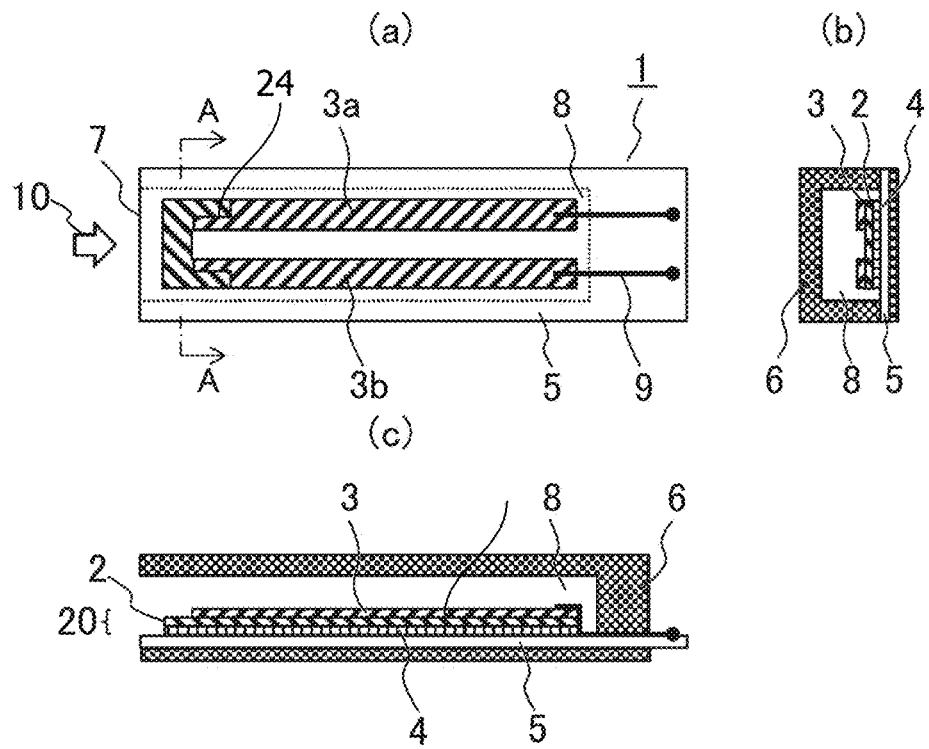
FIG. 9(a) is a top view.
FIG. 9(b) is a side view of the section A-A.
FIG. 9(c) is a front view of a corrosive environment monitoring device 1 of the fifth embodiment.

FIG. 9 (a) is a top view, FIG. 9(b) is a side view of the section A-A, and FIG. 9(c) is a front view of the corrosive environment monitoring device 1 of the fifth embodiment.

The corrosive environment monitoring device 1 of the fifth embodiment differs in the distal end shape on the opening portion 7 side of the sensing metal thin film 3 compared to the corrosive environment monitoring device 1 of the first embodiment.

In the corrosive environment monitoring device 1 of the fifth embodiment, different from the corrosive environment monitoring device 1 of the first embodiment, an area where the width of the sensing metal thin film 3 is narrower (refer to FIG. 9 (a)) compared to an area on the back side of the gas passage 8 (an area with a constant cross-sectional area) is included on the opening portion 7 side of the sensing metal thin film 3. That is to say, in the sensing metal thin film 3 formed in a partial area on the base metal thin film 2, on the opening portion 7 side thereof, there is formed an area where the width of the sensing metal thin film 3 is narrower compared to an area on the back side of the gas passage 8 (an acute portion 24: an area where the width of the sensing metal thin film 3 becomes continuously large from the opening portion 7 side toward the back side of the gas passage 8).

Also, the acute portion 24 may be an area where the width of the sensing metal thin film 3 becomes large continuously.

The acute portion 24 is an area where the cross-sectional area thereof increases from the opening portion 7 side toward the back side of the gas passage 8, and is an area where the width of the sensing metal thin film 3 continuously becomes larger from the opening portion 7 side toward the back side of the gas passage 8. The acute portion 24 is an area where the cross-sectional area thereof is smaller compared to the area on the back side of the gas passage 8.

Since the concentration flux of the corrosive gas 10 having entered from the opening portion 7 concentrates on the acute portion 24 where the width of the sensing metal thin film 3 is narrow, the time incurred until the sending metal thin film 3 corrodes and the corrosion product 31 is produced becomes short, and in the acute portion 24, the extension rate of the area where the corrosion product 31 produced becomes faster compared to an area on the back side of the gas passage 8 with respect to this acute portion 24.

Thus, according to the fifth embodiment, the time from before exposure until the time B after exposure can be shortened, and deterioration of the measurement accuracy at an early stage of monitoring of corrosiveness of the environment can be suppressed.

Sixth Embodiment

Next, the corrosive environment monitoring device 1 of the sixth embodiment will be explained. Also, the basic configuration of the corrosive environment monitoring device 1 of the conventional example applied also to the sixth embodiment.

FIG. 10(a) is a top view, FIG. 10(b) is a side view of the section A-A, and FIG. 10(c) is a front view of the corrosive environment monitoring device 1 of the sixth embodiment.

The corrosive environment monitoring device 1 of the sixth embodiment differs in the point of having a shape of a distal end portion 42 on the opening portion 7 side of the sensing metal thin film 3 compared to the corrosive environment monitoring device 1 of the first embodiment.

Figure 10:
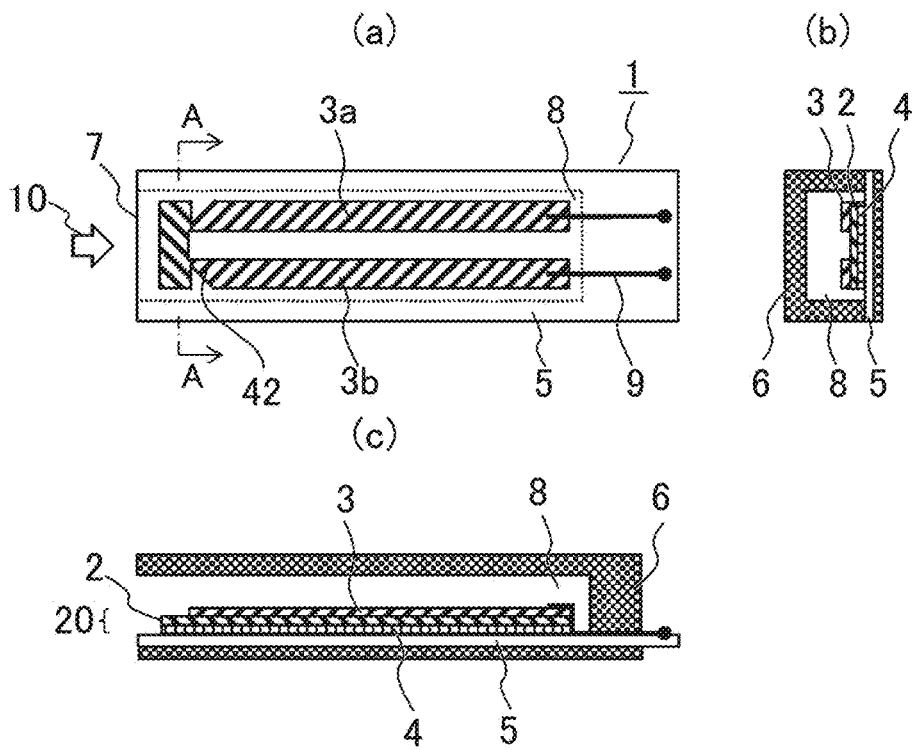
FIG. 10(a) is a top view.
FIG. 10(b) is a side view of the section A-A.
FIG. 10(c) is a front view of a corrosive environment monitoring device 1 of the sixth embodiment.

In the corrosive environment monitoring device 1 of the sixth embodiment, different from the corrosive environment monitoring device 1 of the first embodiment, an area where the width of the base metal thin film 2 and the sensing metal thin film 3 is narrower (refer to FIG. 10 (a)) compared to an area on the back side of the gas passage 8 (an area with a constant cross-sectional area) is included on the opening portion 7 side of the sensing metal thin film 3. That is to say, in the base metal thin film 2 and the sensing metal thin film 3 formed in a partial area on the insulation plate 4, on the opening portion 7 side thereof, there is formed an area where the width of the base metal thin film 2 and the sensing metal thin film 3 is narrower compared to an area on the back side of the gas passage 8 (the distal end portion 42).

This distal end portion 42 is formed in a partial area on the insulation plate 4, and is formed by cutting the base metal thin film 2 and the sensing metal thin film 3 on the opening portion 7 side. Also, the distal end portion 42 can be formed by mechanical cutting in addition to sputtering by masking and etching by masking.

The distal end portion 42 is an area where the cross-sectional area thereof is smaller compared to the area on the back side of the gas passage 8.

According to the sixth embodiment, the distal end portion 42 is an area where the width of the base metal thin film 2 and the sensing metal thin film 3 continuously becomes large compared to the area on the back side of the gas passage 8.

Since the concentration flux of the corrosive gas 10 having entered from the opening portion 7 concentrates on the distal end portion 42, the time incurred until the sensing metal thin film 3 corrodes and the corrosion product 31 is produced becomes short, and in the distal end portion 42, the extension rate of the area where the corrosion product 31 is produced becomes faster compared to an area on the back side of the gas passage 8 with respect to this distal end portion 42.

Thus, according to the sixth embodiment, the time from before exposure until the time B after exposure can be shortened, and deterioration of the measurement accuracy at an early stage of monitoring of corrosiveness of the environment can be suppressed further by an effect of the base metal having a large electric resistance.

Seventh Embodiment

Next, the corrosive environment monitoring device 1 of the seventh embodiment will be explained. Also, the basic configuration of the corrosive environment monitoring device 1 of the conventional example is applied also to the seventh embodiment.

FIG. 11(a) is a top view, FIG. 11(b) is a side view of the section A-A, and FIG. 11(c) is a front view of the corrosive environment monitoring device 1 of the seventh embodiment.

The corrosive environment monitoring device 1 of the seventh embodiment differs in the point of having a shape of a distal end portion 43 on the opening portion 7 side of the sensing metal thin film 3 compared to the corrosive environment monitoring device 1 of the first embodiment.

Figure 11:
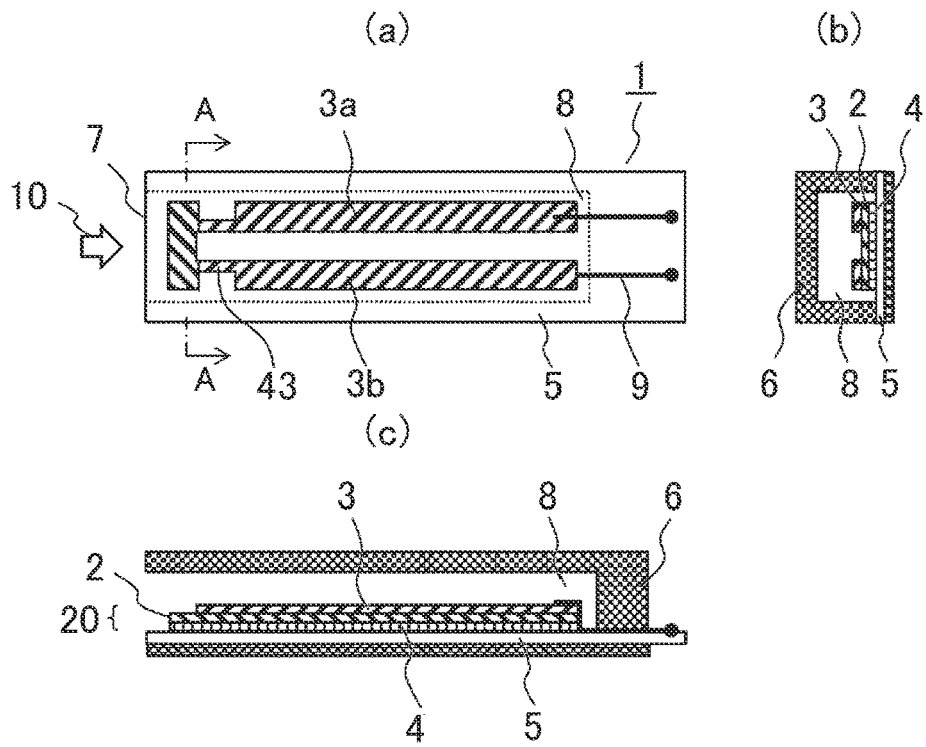
FIG. 11(a) is a top view.
FIG. 11(b) is a side view of the section A-A.
FIG. 11(c) is a front view of a corrosive environment monitoring device 1 of the seventh embodiment.

In the corrosive environment monitoring device 1 of the seventh embodiment, different from the corrosive environment monitoring device 1 of the first embodiment, an area where the width of the base metal thin film 2 and the sensing metal thin film 3 is narrower (refer to FIG. 11 (a)) compared to an area on the back side of the gas passage 8 (an area with a constant cross-sectional area) is included on the opening portion 7 side of the sensing metal thin film 3. That is to say, in the base metal thin film 2 and the sensing metal thin film 3 formed in a partial area on the insulation plate 4, on the opening portion side thereof, there is formed an area where the width of the base metal thin film 2 and the sensing metal thin film 3 is narrower compared to an area on the back side of the gas passage 8 (the distal end portion 43).

This distal end portion 43 is formed in a partial area on the insulation plate 4, and is formed by cutting the base metal thin film 2 and the sensing metal thin film 3 on the opening portion 7 side. Also, the distal end portion 43 can be formed by mechanical cutting in addition to sputtering by masking and etching by masking.

The distal end portion 43 is an area where the cross-sectional area thereof is smaller compared to the area on the back side of the gas passage 8.

According to the seventh embodiment, the distal end portion 43 is an area where the width of the base metal thin film 2 and the sensing metal thin film 3 becomes larger stepwise compared to the area on the back side of the gas passage 8.

Since the concentration flux of the corrosive gas 10 having entered from the opening portion. 7 concentrates on the distal end portion 43, the time incurred until the sensing metal thin film 3 corrodes and the corrosion product 31 is produced becomes short, and in the distal end portion 43, the extension rate of the area where the corrosion product 31 is produced becomes faster compared to an area on the back side of the gas passage 8 with respect to this distal end portion 43.

Thus, according to the seventh embodiment, the time from before exposure until the time B after exposure can be shortened, and deterioration of the measurement accuracy at an early stage of monitoring of corrosiveness of the environment can be suppressed further by an effect of the base metal having a large electric resistance.

Eighth Embodiment

Next, the corrosive environment monitoring device 1 of the eighth embodiment will be explained. Also, the basic configuration of the corrosive environment monitoring device 1 of the conventional example is applied also to the seventh embodiment.

Figure 12:
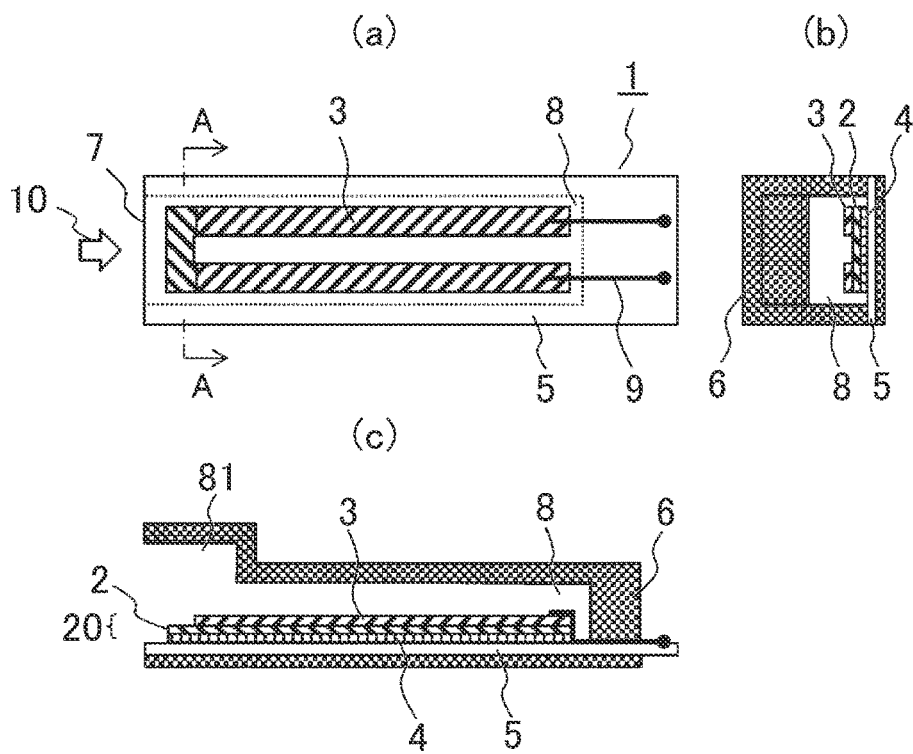
FIG. 12(a) is a top view.
FIG. 12(b) is a side view of the section A-A.
FIG. 12(c) is a front view of a corrosive environment monitoring device 1 of the eighth embodiment.

FIG. 12 (a) is a top view, FIG. 12(b) is a side view of the section A-A, and FIG. 12(c) is a front view of the corrosive environment monitoring device 1 of the eighth embodiment.

The corrosive environment monitoring device 1 of the eighth embodiment differs in the open shape on the opening portion 7 side of the case 6 compared to the corrosive environment monitoring device 1 of the first embodiment.

In the corrosive environment monitoring device 1 of the eighth embodiment, different from the corrosive environment monitoring device 1 of the first embodiment, an area 81 where the height of the gas passage 8 formed in an area on the opening portion 7 side is higher (the cross-sectional area is larger) (refer to FIG. 12 (c)) compared to the height (the cross-sectional area) of the gas passage 8 formed in an area on the back side of the gas passage 8 (an area with a constant cross-sectional area) is included.

The area 81 where the height of the gas passage 8 is high is an area where the cross-sectional area thereof is larger compared to the area on the back side of the gas passage 8.

According to the eighth embodiment, since the area 81 where the height of the gas passage 8 is high is formed, the total volume of the corrosive gas 10 entering from the opening portion 7 increases, and the corrosive gas 10 concentrates on the sensing metal thin film 3 on the opening portion 7 side. Therefore, the sensing metal thin film 3 on the opening portion 7 side corrodes, and in the area 81 where the height of the gas passage 8 is high, the extension rate of the area where the corrosion product 31 is produced becomes faster compared to an area on the back side of the gas passage 8.

According to the eighth embodiment, although the area 81 where the height of the gas passage 8 is high is formed, this area 81 where the height of the gas passage 8 is high may be an area where the height thereof becomes smaller stepwise from the opening portion 7 side toward the back side of the gas passage 8, and may be an area where the height thereof becomes smaller continuously from the opening portion 7 side toward the back side of the gas passage 8.

Thus, according to the eighth embodiment, the time from before exposure until the time B after exposure can be shortened, and deterioration of the measurement accuracy at an early stage of monitoring of corrosiveness of the environment can be suppressed.

Ninth Embodiment

Next, the corrosive environment monitoring device 1 of the ninth embodiment will be explained. Also, the basic configuration of the corrosive environment monitoring device 1 of the conventional example is applied also to the thirteenth embodiment.

Figure 13:
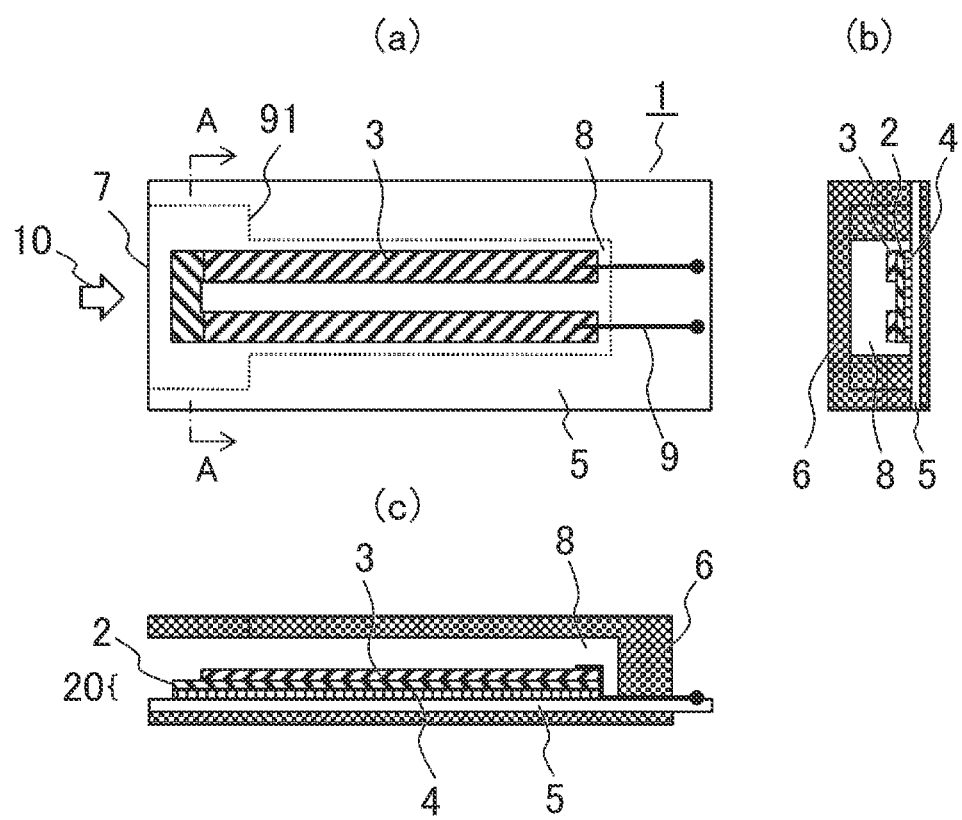
FIG. 13(a) is a top view.
FIG. 13(b) is a side view of the section A-A.
FIG. 13(c) is a front view of a corrosive environment monitoring device 1 of the ninth embodiment.

FIG. 13 (a) is a top view, FIG. 13(b) is a side view of the section A-A, and FIG. 13(c) is a front view of the corrosive environment monitoring device 1 of the ninth embodiment.

The corrosive environment monitoring device 1 of the ninth embodiment differs in the open shape on the opening portion 7 side of the case 6 compared to the corrosive environment monitoring device 1 of the first embodiment.

In the corrosive environment monitoring device 1 of the ninth embodiment, different from the corrosive environment monitoring device 1 of the first embodiment, an area 91 where the width of the gas passage 8 formed in an area on the opening portion 7 side is wider (the cross-sectional area is larger) (refer to FIG. 13 (a)) compared to the width (the cross-sectional area) of the gas passage 8 formed in an area on the back side of the gas passage 8 (an area with a constant cross-sectional area) is included.

The area 91 where the width of the gas passage 8 is wide is an area where the cross-sectional area thereof is larger compared to the area on the back side of the gas passage 8.

According to the ninth embodiment, since the area 91 where the width of the gas passage 8 is wide is formed, the total volume of the corrosive gas 10 entering from the opening portion 7 increases, and the corrosive gas 10 concentrates on the sensing metal thin film 3 on the opening portion 7 side. Therefore, sensing metal thin film 3 on the opening portion 7 side corrodes, and in the area 91 where the width of the gas passage 8 is wide, the extension rate of the area where the corrosion product 31 is produced becomes faster compared to an area on the back side of the gas passage 8.

According to the ninth embodiment, although the area 91 where the width of the gas passage 8 is wide is formed, this area 91 where the width of the gas passage 8 is wide may be an area where the width thereof becomes smaller stepwise from the opening portion 7 side toward the back side of the gas passage 8, and may be an area where the width thereof becomes smaller continuously from the opening portion 7 side toward the back side of the gas passage 8.

Thus, according to the ninth embodiment, the time from before exposure until the time B after exposure can be shortened, and deterioration of the measurement accuracy at an early stage of monitoring of corrosiveness of the environment can be suppressed.

Also, the present invention is not to be limited to the embodiments described above, and is to include various modifications. For example, the embodiments described above were explained specifically for easy understanding of the present invention, and it is not necessarily limited to one including all configurations having been explained.

Also, a part of a configuration of an embodiment can be substituted by a part of a configuration of other embodiments. Also, a configuration of an embodiment can be added with a configuration of other embodiments. Further, with respect to a part of the configuration of each embodiment, it is also possible to delete it, to add a part of other configurations, and to be substituted by a part of other configurations.

REFERENCE SIGNS LIST

1 . . . corrosive environment monitoring device, 2 . . . base metal thin film, 3 . . . sensing metal thin film, 4 . . . insulation plate, 5 . . . substrate, 6 . . . case, 7 . . . opening portion, 8 . . . gas passage, 9 . . . leading electrode, 10 . . . corrosive gas, 20 . . . sensor chip, 31 . . . corrosion product, 41 . . . coating thin film, 42 . . . distal end portion, 43 . . . distal end portion, 81 . . . area where height of gas passage 8 is high, 91 . . . area where width of gas passage 8 is wide.

The invention claimed is:

1. A corrosive environment monitoring device comprising:
a laminated body including an insulation plate, a base metal thin film, and a sensing metal thin film, the base metal thin film being formed on the insulation plate and being resistant to corrosion by a corrosive substance, the sensing metal thin film being formed on the base metal thin film and being susceptible to corrosion by the corrosive substance; and
a case containing the laminated body, including an opening portion in a side surface direction, and forming a gas passage for the corrosive substance in the inside, wherein the sensing metal thin film is formed in a partial area on the base metal thin film,
wherein a coating thin film is formed in the sensing metal thin film on the opening portion side of the sensing metal thin film.

2. The corrosive environment monitoring device according to claim 1, wherein
the partial area is two long side portions formed from the opening portion side toward the back side of the gas passage with the exception of a short side portion.

3. The corrosive environment monitoring device according to claim 1, wherein
an acute portion is formed on the opening portion side of the sensing metal thin film.

4. The corrosive environment monitoring device according to claim 1, wherein
a distal end portion is formed on the opening portion side of the base metal thin film and the sensing metal thin film formed in a partial area of the insulation plate, the distal end portion having a narrower width of the base metal thin film and the sensing metal thin film compared to an area on the back side of the gas passage.

5. The corrosive environment monitoring device according to claim 1, wherein
a cross-sectional area of the gas passage formed in an area on the opening portion side is larger compared to a cross-sectional area of the gas passage formed in an area on the back side of the gas passage.

6. A corrosive environment monitoring method comprising steps of:
using a corrosive environment monitoring device including a laminated body and a case, the laminated body including an insulation plate, a base metal thin film, and a sensing metal thin film, the base metal thin film being formed on the insulation plate and being resistant to corrosion by a corrosive substance, the sensing metal thin film being formed on the base metal thin film and being susceptible to corrosion by the corrosive substance, the case containing the laminated body, including an opening portion in a side surface direction, and forming a gas passage for the corrosive substance in the inside; and
measuring a degree of corrosion in the environment, wherein
the sensing metal thin film is formed in a partial area of the base metal thin film, and accelerates an extension rate of an area where a corrosion product is produced in the partial area, wherein an acute portion is formed on the opening portion side of the sensing metal thin film.

7. A corrosive environment monitoring device comprising:
a laminated body including an insulation plate, a base metal thin film, and a sensing metal thin film, the base metal thin film being formed on the insulation plate and being resistant to corrosion by a corrosive substance, the sensing metal thin film being formed on the base metal thin film and being susceptible to corrosion by the corrosive substance; and
a case containing the laminated body, including an opening portion in a side surface direction, and forming a gas passage for the corrosive substance in the inside,
wherein the sensing metal thin film is formed in a partial area on the base metal thin film,
wherein a distal end portion is formed on the opening portion side of the base metal thin film and the sensing metal thin film formed in a partial area of the insulation plate, the distal end portion having a narrower width of the base metal thin film and the sensing metal thin film compared to an area on the back side of the gas passage.

* * * * *